United States Patent [19]

Hiratsuka et al.

[11] Patent Number: 5,029,610
[45] Date of Patent: Jul. 9, 1991

[54] FLOW-CONTROL TYPE PIEZOELECTRIC ELEMENT VALVE

[75] Inventors: Hajime Hiratsuka; Kozo Kawasaki; Yasuhiko Miyo, all of Ibaragi, Japan

[73] Assignee: Japan Atomic Energy Research Institute, Tokyo, Japan

[21] Appl. No.: 481,821

[22] Filed: Feb. 14, 1990

[30] Foreign Application Priority Data

Feb. 16, 1989 [JP] Japan .................................. 1-17209

[51] Int. Cl.⁵ ............................................. F16K 31/04
[52] U.S. Cl. ................................. 137/557; 251/129.06
[58] Field of Search .................... 251/129.06; 137/557, 137/487.5

[56] References Cited

U.S. PATENT DOCUMENTS 4,617,952 10/1986 Fujiwara et al. ........... 251/129.06 X

FOREIGN PATENT DOCUMENTS 0190985 8/1988 Japan .............................. 251/129.06
1170202 7/1985 U.S.S.R. .......................... 251/129.06

Primary Examiner—Arnold Rosenthal
Attorney, Agent, or Firm—Wenderoth, Lind & Ponack

[57] ABSTRACT

A flow-control type piezoelectric element valve simplifies calibration of the gas flow rate, permits stable control of the gas flow rate and facilitates to supply a gas at stable flow rate. A gap is produced between a valve seat and a sealing portion comprising a sheet arranged on the top of the valve seat and a piezoelectric element, by applying from a current installation element to the piezoelectric element. Then a gas is introduced into a gas channel within the valve seat through the gap, pressure of the gas flowing along the gas channel is detected by means of a pressure sensor mounted near the outlet of the gas channel. According to correlation between pressure and gas flow rate in the output characteristics on the pressure sensor, the flow rate at the time when a gas flows along the gas channel can be accurately and easily calculated.

3 Claims, 4 Drawing Sheets

FLOW-CONTROL TYPE PIEZOELECTRIC ELEMENT VALVE

FIELD OF THE INVENTION

The present invention relates to a flow-control type piezoelectric element valve, and more particularly, to a flow-control type piezoelectric element valve which simplifies calibration of the gas flow rate, eliminates the necessity of periodical calibration of the gas flow rate, and permits stable control of the gas flow rate.

DESCRIPTION OF THE PRIOR ART

As piezoelectric element valves, there have been known the unimorph type piezoelectric element valve,, the bimorph type piezoelectric element valve and the lamination type piezoelectric element valve.

These piezoelectric element valves require periodical calibration of the gas flow rate, because changes with in sealant, the piezoelectric element or the like with time has an important effect on the characteristics of the gas flow rate. For the purpose of calibrating the gas flow rate of these piezoelectric element valves, therefore, it has been the usual practice to adopt the build-up method in which a vacuum testing device comprising a vacuum vessel, a vacuum gage, a sluice valve, a vacuum pump or the like is used, and which involve evacuating the vacuum vessel by means of the vacuum pump, then closing the sluice valve, actuating the piezoelectric element valve, and then measuring the increase of pressure in the vacuum vessel.

For a piezoelectric element valve mounted in a nuclear fusion device, for example, calibration of the gas flow rate is carried out by evacuating the port manifold by means of an exhauster, closing a gate valve, then applying the build-up method as described above.

In the absence of the gate valve, however, this calibration of the gas flow rate cannot be practiced, making it impossible to control calibration of the gas flow rate of the piezoelectric element valve within the prescribed accuracy range. This exerts a significant adverse effect, for example, on the production of nuclear fusion plasma or on the degree of vacuum of the vacuum vessel in a nuclear fusion device. Therefore, there is a demand for a piezoelectric element valve which has a simplified flow rate calibration and eliminates the necessity of the periodical flow rate calibration.

The present invention was made in view of the drawbacks of conventional values as described above, and has an object to provide a flow-control type piezoelectric element valve useful as a gas injection valve for a nuclear fusion device, which overcomes the defect of the gas flow rate calibration on the conventional piezoelectric element valve, simplifies the flow rate calibration, eliminates the necessity of periodical flow rate calibration, and supplies gas at a stable flow rate.

This and other objects of the present invention will become apparent from the detailed description and drawings which follow.

DETAILED DESCRIPTION OF THE INVENTION

According to a flow-control type piezoelectric valve of the present invention, a gap is produced at the contact portion between a valve seat and a sealing portion which comprises a sheet arranged on the upper surface of the valve seat and a piezoelectric element, for example, by applying voltage from a current installation element arranged on a flange of the piezoelectric element. By introducing a gas through this gap into a gas channel within the valve seat, pressure of the gas flowing therein can be accurately detected by means of a pressure sensor vacuum-sealed near the gas channel in the valve seat.

Furthermore, the gas flow rate at the time when the gas flows along the gas channel within the valve seat can be accurately and easily calculated from the detected pressure in dependence upon the correlation between gas pressure and flow rate thereof in the output characteristics of the pressure sensor.

Figure 1:
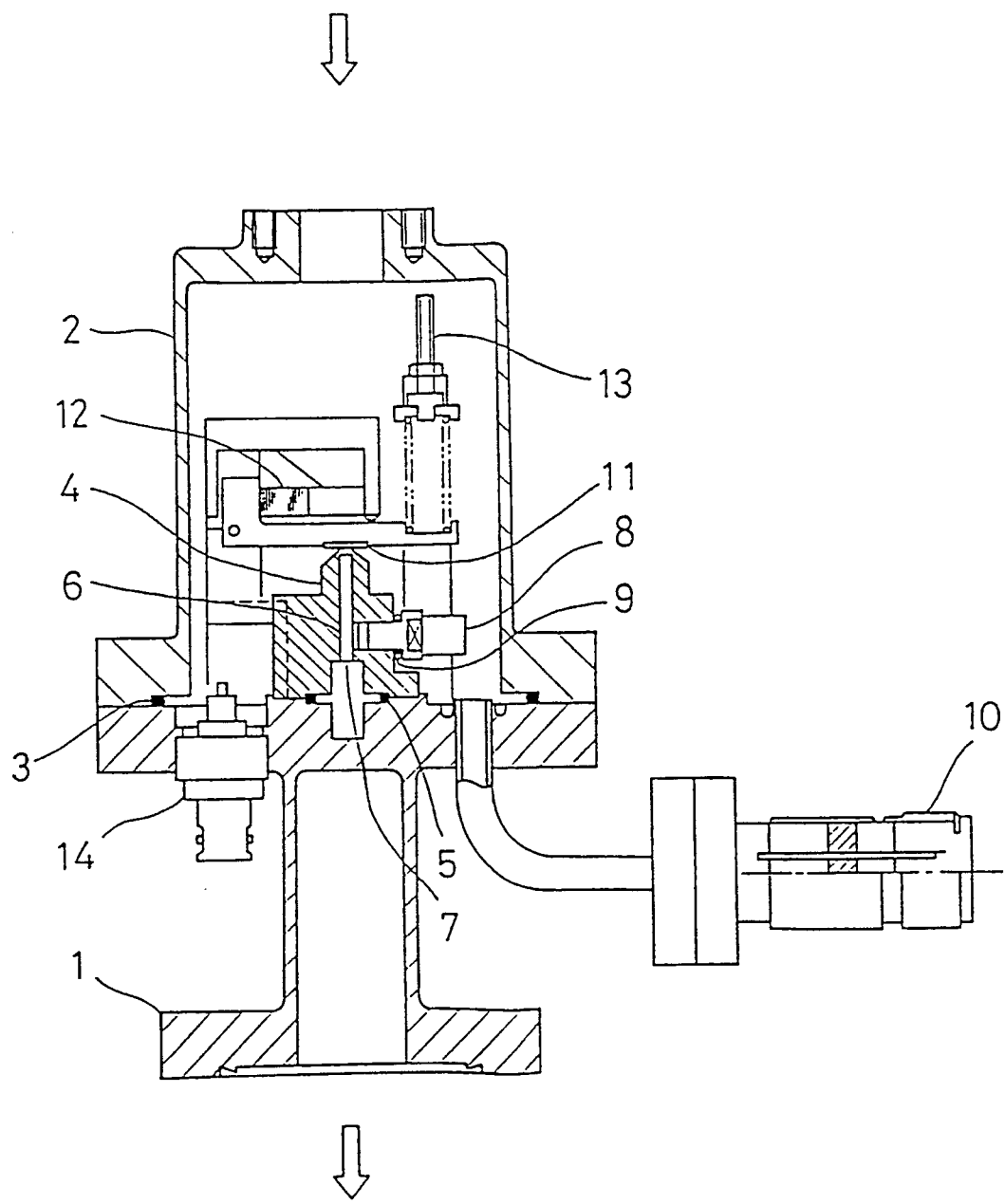
FIGS. 1 and 2 are a longitudinal and a transverse sectional view, respectively, illustrating an embodiment of the flow-control type piezoelectric element valve of the present invention.
Figure 2:
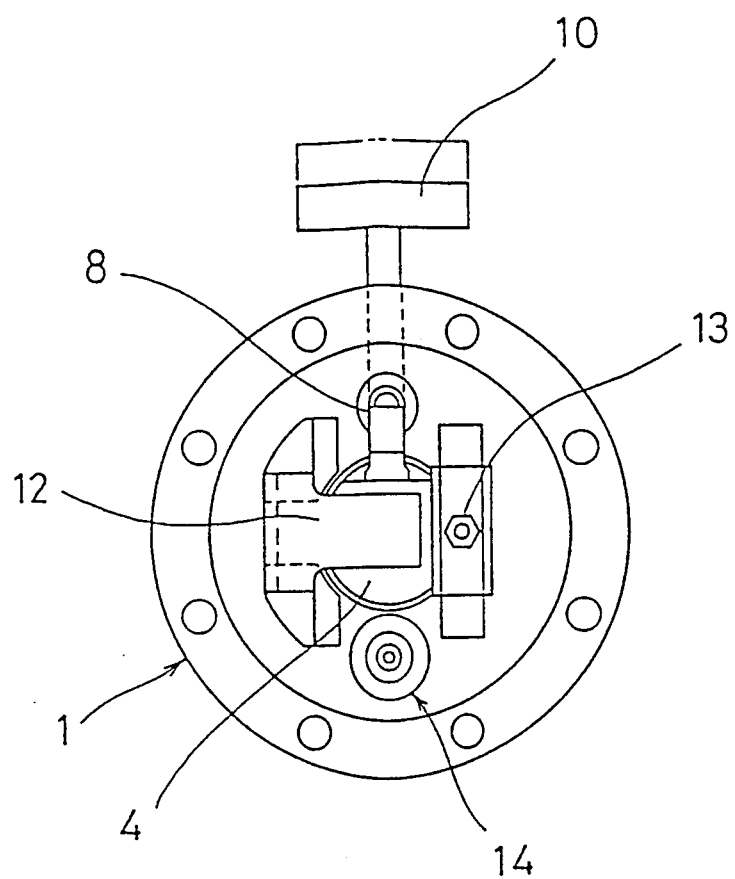

The embodiment shown in FIGS. 1 and 2 is a flow-control type piezoelectric element valve using a lamination type piezoelectric element. In this embodiment, an exit flange (1) and an inlet flange (2) are connected through an O ring (3), and a valve seat (4) having the top portion thereof formed into a protrusion is mounted on an upper surface of the exit flange (1) through another O ring (5). A gas channel (6) is provided in this valve seat (4), and an orifice (7) is also provided at the exit and of the valve seat (4). A pressure sensor (8) is arranged near the exit of the gas channel (6) in the valve seat (4) and is vacuum-sealed thereto by means of further another O ring (9). The means to seal is not limited to O rings (3), (5) and (9), and any appropriate sealing means can be used.

The pressure sensor (8) is connected to a connector (10), through which a pressure signal sensed by the pressure sensor (8) can be sent to a pressure gage not shown in FIGS. 1 and 2. For this pressure sensor (8) an appropriate range of pressure detection may be adopted depending upon the flow rate range of the piezoelectric element valve. It is desirable to use the pressure sensor in response to the gas flow rate.

A sheet (11) is arranged above the upper surface of the valve seat (4), and a lamination type piezoelectric element valve (12) and an adjusting screw (13) are mounted on the sheet (11). Vacuum-sealing is accomplished by the valve seat (4) engaged by the sheet (11), and the degree of this vacuum-sealing can be adjusted by means of the adjusting screw (13). The sheet (11) and the piezoelectric element 4 constitute the sealing portion.

Additionally, a voltage supply element (14) is arranged in of the exit flange (1) and is connected to the lamination type piezoelectric element (12). In the flow-control type piezoelectric element valve having the constitution described above, for example, application of voltage from the voltage supply element (14) to the lamination type piezoelectric element (12) causes displacement of the lamination type piezoelectric element (12), this displacement producing a gag between the valve seat (4) and the sealing portion constituted by the sheet (11) and the piezoelectric element such as the lamination type piezoelectric element (12), and gas introduced through the inlet flange (2) flows along the gas channel (6) in the valve seat (4), thus causing an increase of pressure within the valve seat (4). The gas pressure at this moment is sensed by the pressure sensor (8) arranged near the exit of the gas channel (6). When voltage application from the voltage supply element (14) is stopped, the gap produced between the valve seat (4) and the sealing portion during voltage application disappears and valve seat 4 is vacuum-sealed again.

Even though the gas flow rate varies with time due to aging of the piezoelectric element or the like as above-mentioned, it is possible to accurately detect the gas pressure in the valve seat (4), and furthermore, to easily calculate the gas flow rate from the detected pressure thereof as described below in connection with FIG. 4.

In addition, by combining a pressure gage and a power source for the flow-control type piezoelectric element valve not shown in FIGS. 1 and 2, it is even possible to automatically control the gas flow rate.

Figure 3:
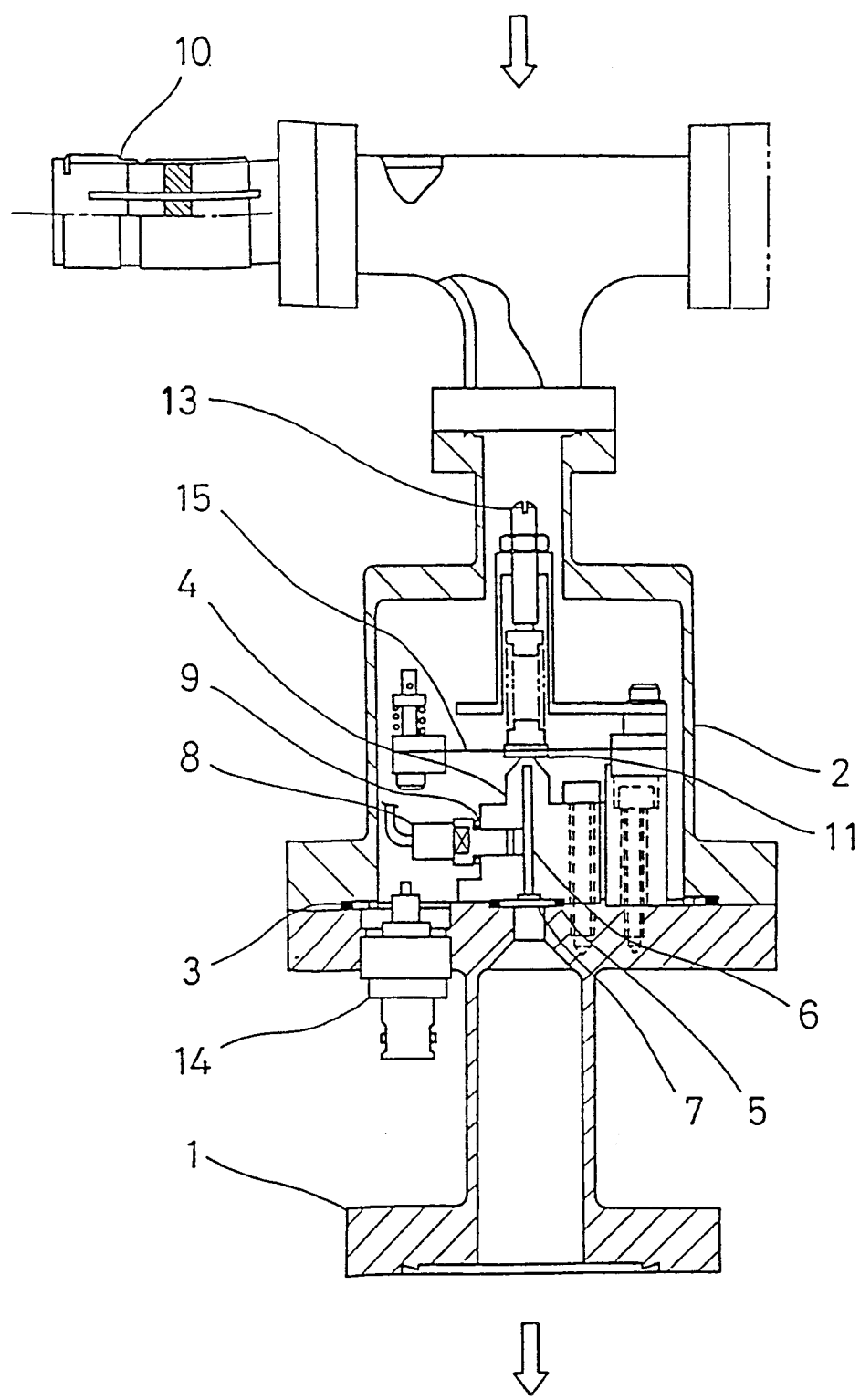
FIG. 3 is a longitudinal sectional view illustrating another embodiment of the flow-control type piezoelectric element valve of the present invention.

Another embodiment shown in FIG. 3 is a flow-control type piezoelectric element valve using a bimorph type piezoelectric element (15) as the piezoelectric element. The position of the connector (10) for leading a signal from the pressure sensor (8) is different from that shown in FIG. 1. This is because the types of the used piezoelectric elements used are different from each other. Thus, there is no limitation in the position of arrangement of the connector (10), which may be installed at any position depending upon the type of the used piezoelectric element.

Figure 4:
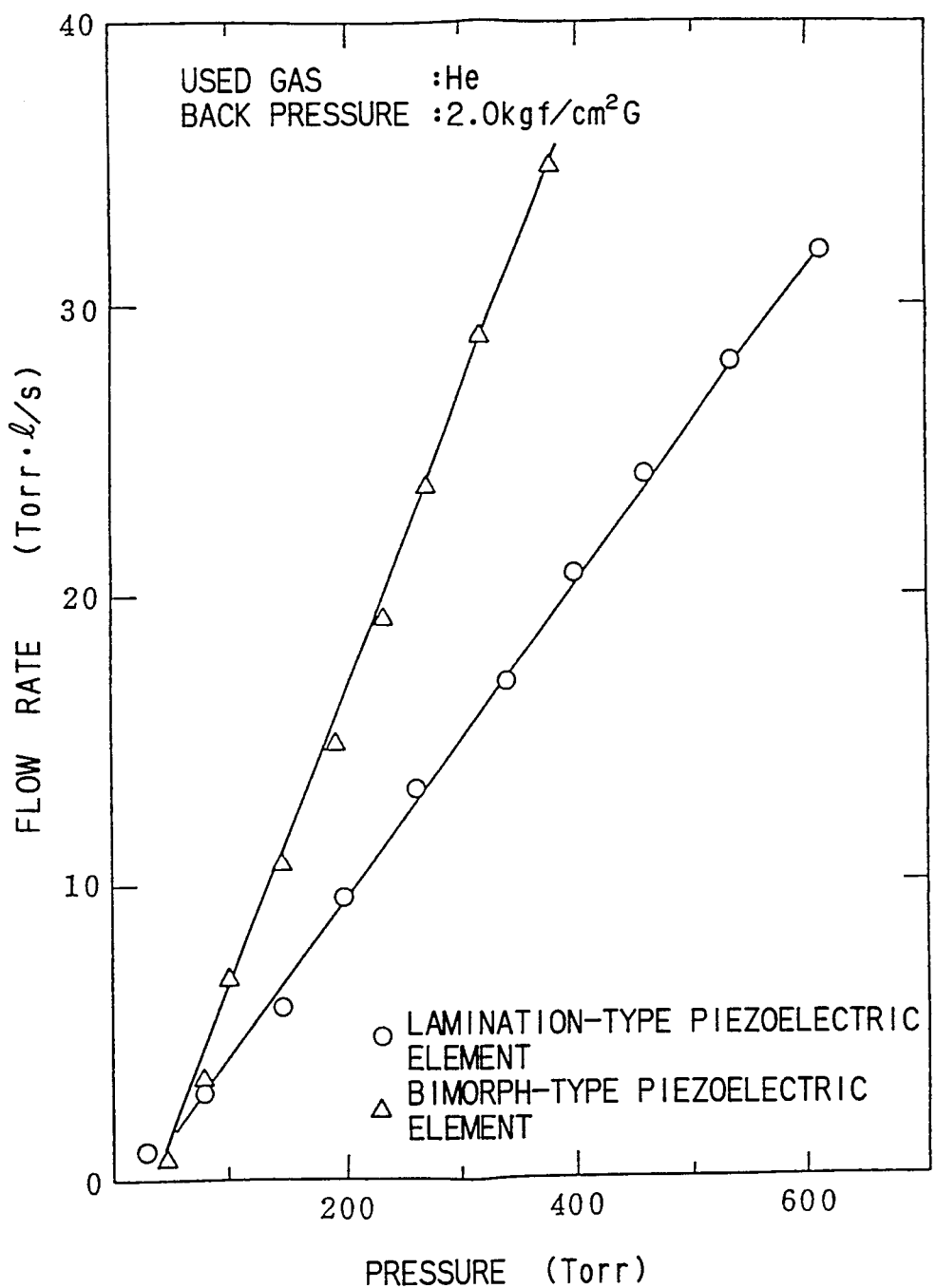
FIG. 4 is a correlation diagram between pressure and gas flow rate showing output characteristics of a pressure sensor using the helium gas.

FIG. 4 illustrates the output characteristics of pressure on the pressure sensor (8) in the flow-control type piezoelectric element valve of the present invention, as typically described above.

FIG. 4 is a correlation diagram of the pressure and flow rate in a case where a gap is formed between the valve seat (4) and the sealing portion by applying voltage from the current installation element (14) to the piezoelectric elements (12) and (15) under a back pressure (gas supply pressure) of 2.0 kg/cm$^2$G, and helium gas is introduced into the gas channel (6) within the valve seat (4): the characteristics of 760-Torr (1.0 kg/cm$^2$) pressure sensors for a flow rate range up to 40 Torr. l/s is shown by the respective curves in FIG. 4. One is for a lamination type element as shown in FIGS. 1 and 2, the other is for a bimorph type element as shown in FIG. 3. By use of such correlation between gas pressure and flow rate thereof in the output characteristics of the pressure sensor (8), the gas flow rate at the time when a gas flows along the gas channel (6) within the valve seat (4) can be accurately and easily calculated from the detected pressure. Additionally, a pressure sensor suitable to the gas flow rate can be utilized in the flow-control type piezoelectric element valve of the present invention. Thus, it is possible to accurately detect gas pressure after the first calibration of the flow rate even though a gas flow rate varies with time due to change of the piezoelectric element or the like, and also to accurately and easily calculate the gas flow rate from the detected gas pressure. A periodical calibration test based on the conventional build-up method is no longer necessary. Even in the absence of a sluice valve, the gas flow rate can be calculated by means of the pressure sensor provided in the valve seat.

It is needless to mention that the present invention is not limited to the above embodiments. Various embodiments are available with variations in detail involving the structure and constitution of the flow-control type piezoelectric element valve, the range of the gas flow rate, the kind of the gas or the like.

We claim:

1. A flow-control type piezoelectric element valve comprising:
   a gas channel extending through said valve and having an inlet end and an outlet end;
   a valve seat at said inlet end of said gas channel;
   a valve opening and closing means including a sealing means engagable with said valve seat for closing said valve and movable away from said valve seat for opening said valve and said means including a piezoelectric element energizable for moving said opening and closing means and having at least two states of energization, a first one and a second one, said sealing means being engaged with said valve seat in the first state of energization and being moved away from said valve seat in the second state of energization; and
   a pressure sensor in said valve and positioned near the outlet end of said gas channel for sensing the pressure of gas in said gas channel.

2. A flow-control type piezoelectric element valve as claimed in claim 1 in which said valve seat is a protruding tapered-shaped seat projecting toward the inlet end of said gas channel, and said sealing means being engagable with the end of said protruding tapered-shaped seat.

3. A flow-control type piezoelectric element valve as claimed in claim 1 in which said sealing means is a sheet engagable with said valve seat, and said piezoelectric element is mounted on said sheet.

* * * * *